United States Patent [19]

Aoyama et al.

[11] Patent Number: 4,801,499
[45] Date of Patent: Jan. 31, 1989

[54] OPTICAL RECORDING MEDIUM

[75] Inventors: Akira Aoyama; Shigeru Kogure; Mamoru Sugimoto, all of Nagano, Japan

[73] Assignee: Seiko Epson Corporation, Tokyo, Japan

[21] Appl. No.: 819,659

[22] Filed: Jan. 17, 1986

[30] Foreign Application Priority Data

Jan. 24, 1985 [JP] Japan .................................. 60-11355
Aug. 19, 1985 [JP] Japan .................................. 60-181351

[51] Int. Cl.$^4$ .............................................. G11B 7/24
[52] U.S. Cl. ..................... 428/336; 365/122; 369/13; 369/288; 428/694; 428/900
[58] Field of Search ............... 428/692, 694, 900, 336; 365/122; 360/131, 134; 369/13, 288

[56] References Cited

U.S. PATENT DOCUMENTS

| 4,525,028 | 6/1985 | Dorschner | 350/377 |
| 4,569,881 | 2/1986 | Freese et al. | 428/213 |
| 4,579,777 | 4/1986 | Honguu et al. | 428/472 |
| 4,610,912 | 9/1986 | Takahashi et al. | 428/698 |
| 4,658,388 | 4/1987 | Ishiwatari et al. | 430/945 |

FOREIGN PATENT DOCUMENTS 3500314 7/1985 Fed. Rep. of Germany .
2143689 2/1985 United Kingdom ................ 365/122

OTHER PUBLICATIONS

Mansuripur et al., "Optimum Disk Structues and Energetics of Domain Formation in Magneto-Optical Recording" IEEE Trans. on Magnetics, Mag-18, No. 6, Nov. 1982, p. 1241.
Stoffel, "Thin-Film Magneto-Optic Read-Write Memory Element" IBM TDB, vol. 12, No. 1, Jun. 1969, p. 209.
"Optical Disks Systems Emerge" Bartolini et al., IEEE Spectrum, Aug. 1978, p. 20.
Cuomo et al., "Antireflection Coatings for the Enhancement of Magneto-Optic Effects in Amorphous Rare-Earth-Transition Metal Alloys", IBM TDB, vol. 16, No. 5, Oct. 1973, p. 1442.

Primary Examiner—Paul J. Thibodeau
Attorney, Agent, or Firm—Blum Kaplan

[57] ABSTRACT

A magneto-optic recording medium including a transparent substrate and a non-oxide dielectric layer formed thereon is provided. The dielectric layer includes a first dielectric material of the type which exhibits cracks running in a generally radial direction when deposited on a surface and which is designated dielectric Group A and a second dielectric material which exhibits cracks running in a generally tangential direction when deposited on a surface and which is designated dielectric Group B. The dielectric layer may be separate layers or a mixture of the two dielectric materials.

29 Claims, 8 Drawing Sheets

OPTICAL RECORDING MEDIUM

BACKGROUND OF THE INVENTION

This invention relates to magneto-optic recording media and, in particular, to magneto-optic recording media having a non-oxide dielectric layer of two different dielectric materials disposed between a transparent substrate and the recording layer.

The following methods are generally used to record information on optical recording media;

1. Condensed laser light is irradiated onto a magnetic recording layer in order to invert the magnetization of the magnetic recording layer; or 2. Laser light is irradiated onto a recording layer to change the crystalline structure of the recording layer, for example, from crystalline to amorphous, from amorphous to crystalline, from hexagonal to cubic, from cubic to hexagonal and the like, by utilizing the phase transition of the laser light irradiated onto the recording layer to transform the recording region by making holes, forming bubbles and the like.

A conventional magneto-optic recording medium is shown in FIG. 1. A plastic substrate 1 such as PMMA, PC, epoxy resin and the like having guide grooves is provided. A magneto-optic recording layer 2 such as terbium-iron (TbFe), gadolinium-terbium-iron (GdTbFe), gadolinium-terbium-iron-cobalt (GdTbFeCo) and terbium-iron-cobalt (TbFeCo) is formed on substrate 1. A dielectric film 3 such as silicon dioxide ($SiO_2$) is formed on magneto-optic recording layer 2.

FIG. 2 shows another example of a conventional magneto-optic recording medium in which a glass substrate 4 is used in place of plastic substrate 1 of FIG. 1. In FIG. 2, glass substrate 4 is provided with an ultraviolet curing resin layer 5 for forming guide grooves on substrate 4. A magneto-optic recording layer 6 and dielectric layer 7 are formed on ultraviolet curing resin layer 5. However, both plastic substrate 1 of FIG. 1 and ultraviolet curing resin layer 5 of FIG. 2 have high water vapor absorption and high permeability to gasses. For this reason, magneto-optic recording layers 2 and 6 oxidize easily even with protective silicon dioxide ($SiO_2$) dielectric film layers 3 and 7 provided thereon. Magneto-optic recording layers 2 and 6 can still oxidize on the side facing substrates 1 and 4. Such oxidation results in deterioration of magnetic properties, causes the film to peel off and creates other problems.

FIG. 3 shows an example of an improved conventional magneto-optic recording medium in which a second dielectric film 9 is formed between a substrate 8 and a magneto-optic recording layer 10. Magneto-optic recording layer 10 is sandwiched between two dielectric films 9 and 11. As shown in FIG. 3, substrate 8, which may be plastic as shown in FIG. 1 or glass with an ultraviolet curing resin layer as shown in FIG. 2, is provided. A dielectric film 9 such as $SiO_2$ is formed on substrate 8, magneto-optic recording layer 10 is formed on dielectric film 9 and another dielectric film 11 is formed on the magneto-optic recording layer 10, as shown in FIGS. 1 and 2.

Another improved recording medium to which a reflective film 12 is added to the structure of FIG. 3 is shown in FIG. 4. The purpose of providing reflective film 12 is to enhance the magneto-optic effect of the medium rather than to improve weatherability. As shown in FIG. 4, reflective film 12 may be aluminum, copper or the like. Although the weatherability of the magneto-optic recording media is improved using this structure as compared with the structures of FIGS. 1 and 2, it is not completely satisfactory. This is because $SiO_2$ dielectric films are oxides and free oxygen tends to oxidize the magneto-optic recording layer. In order to avoid this problem, it would be desirable to use non-oxide dielectric materials which do not yield free oxygen. However, only oxide films such as silicon dioxide ($SiO_2$), titanium dioxide ($TiO_2$) and aluminum trioxide ($Al_2O_3$) adhere sufficiently to a plastic substrate such as PMMA, PC, epoxy resin and the like or to a glass substrate having an ultraviolet curing resin layer.

Non-oxide dielectric films such as silicon nitride, aluminum nitride and zinc sulfide have not been used because cracking occurs either during formation of the dielectric film or during weatherability testing. In order to make non-oxide dielectric materials that are suitable for use, methods for improving the weatherability have been introduced. For example, improvement in weatherability of magneto-optic recording layers has been attempted as described in Journal of Japan Applied Magnetics Society, Vol. 8, No. 2, 1984, p. 105, and in Summaries of Lectures in the 8th Japan Applied Magnetics Society Conference, p. 125. Alternatively, a protective film made of a metal, such as aluminum and titanium as described in Summaries of Lectures in the 8th Japan Applied Magnetics Society Conference, p. 148 is used. However, even using these improved methods, oxidation of the magneto-optic recording layer from the substrate side is not prevented.

Alternatively, the substrate itself and guide grooves provided thereon have been experimentally formed only of glass without an ultraviolet curing resin layer as described in Summaries of Lectures in the 7th Japan Applied Magnetics Society Conference, p. 155, and in Summaries of Lectures in the 8th Japan Applied Magnetics Society Conference, p. 239. While this improves the weatherability to a level that is good enough for use, formation of guide grooves on glass is not suitable for mass production because it is extremely expensive. For these reasons, suitable dielectric films for use on plastic substrates and on ultraviolet curing resin layers have not been found.

Accordingly, it is desirable to provide an improved magneto-optic recording media which overcomes the disadvantages found in prior art recording media.

SUMMARY OF THE INVENTION

Generally speaking, in accordance with the invention an optical recording medium having superior weatherability including a non-oxide dielectric film formed on a transparent substrate is provided. The non-oxide dielectric layer includes a first dielectric material of dielectric Group A which materials exhibit cracks running in a generally radial direction and a second dielectric material of dielectric Group B which materials exhibit cracks running in a generally tangential direction. The dielectric layer may include at least one layer of a dielectric material belonging to dielectric Group A and a second layer of a dielectric material belonging to dielectric Group B provided between the transparent substrate and the magneto-optic recording layer. Alternatively, a mixed dielectric layer formed by mixing at least one material from dielectric Group A and at least one material from dielectric Group B can be utilized.

It is an object of the invention to provide an improved optical recording medium.

It is another object of the invention to provide an improved dielectric layer for use in a magneto-optic recording medium.

It is a further object of the invention to provide a magneto-optic recording medium having a non-oxide dielectric layer and a high degree of weatherability.

Yet another object of the invention is to provide a magneto-optic recording medium in which no cracking occurs in the non-oxide dielectric film layer.

Yet a further object of the invention is to provide a magneto-optic recording medium in which a non-oxide dielectric film is adhered to a plastic substrate or to a glass substrate having an ultraviolet curing resin layer.

Still another object of the invention to provide a novel magneto-optic recording medium at low cost.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

DESCRIPTION OF THE DRAWINGS

For a fuller understanding of the invention, reference is had to the following description taken in connection with the accompanying drawings in which.

DESCRIPTION OF THE PREFERRED EMBODIMENTS

When non-oxide dielectric films are formed on transparent disk substrates, particularly plastic substrates, cracking occurs either during formation of the film or during weatherability testing. For this reason, structures using non-oxide dielectric films have not been in practical use. Reducing the thickness of the non-oxide dielectric film prevents cracking of the film during formation. If the thickness of the non-oxide dielectric film is reduced and cracking still occurs, the cracks run generally in either the radial or the tangential direction depending on the components of the dielectric film.

Components of dielectric films which exhibit cracks running generally in the radial direction are classified as dielectric Group A. Components of dielectric films which exhibit cracks running generally in the tangential direction are classified as dielectric Group B. According to the present invention, at least one member of dielectric Group A is utilized in combination with at least one member of dielectric Group B to form a dielectric layer. The dielectric layer may include a film of at least one component of each of dielectric Group A and dielectric Group B. Alternatively, a compound dielectric film of a mixture of at least one component of dielectric Group A and at least one component of dielectric Group B is formed. In this manner, an optical recording medium having a high degree of weatherability and in which no cracking occurs is provided.

Magneto-optic recording media prepared in accordance with the invention are suitable when information is recorded by inversion of magnetization caused by irradiation of condensed laser beams to the magneto-optic recording layer formed on one side of the transparent substrate. A dielectric layer of at least two layers or a dielectric film of a mixture of the two types of dielectrics is provided between the magneto-optic recording layer and the transparent substrate.

For a better understanding of the invention, reference is had to the following examples. These examples are presented for purposes of illustration only and are not intended to be construed in a limiting sense.

EXAMPLE 1

Figure 5:
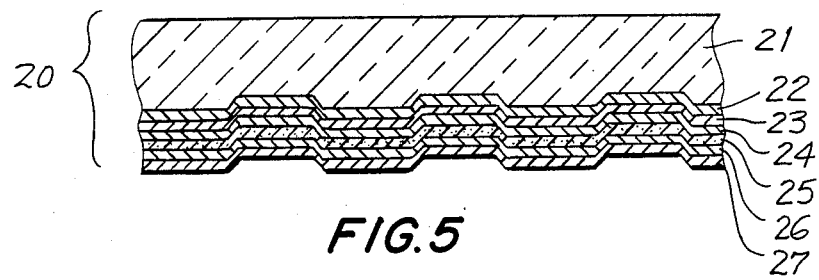
FIG. 5 is a cross-sectional view of a magneto-optic recording medium in accordance with the invention.

In FIG. 5 a magneto-optic recording medium in accordance with the invention is shown generally as 20. Recording medium 20 includes a PMMA substrate 21 having grooves with a pitch of 1.6 μm, a width of 0.8 μm and a depth of 700 Å. A series of dielectric layers 22, 23 and 24 are disposed on the grooved side of PMMA substrate 21. Dielectric layer 22 is an aluminum nitride film having a thickness of 250 Å, dielectric layer 23 is a silicon nitride film having a thickness of 500 Å, and dielectric layer 24 is an aluminum nitride film having a thickness of 250 Å. A GdTbFeCo film 25 having a thickness of 300 Å was formed on dielectric layer 24 for use as the magneto-optic recording layer. An amorphous silicon layer 26 having a thickness of 150 Å is disposed on magneto-optic recording layer 25 to enhance the polarizing face of the laser beam passed through magneto-optic recording layer 25. An aluminum film layer 27 having a thickness of 300 Å is formed on magneto-optic recording layer 25 for use as a reflecting film.

Figure 6:
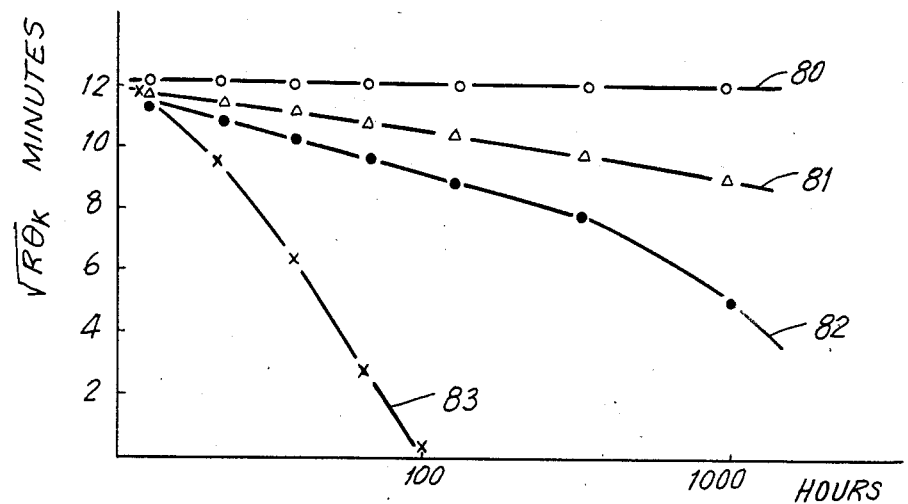
FIG. 6 is a graph showing the Figure of Merit as a function of time for the magneto-optic recording medium of FIG. 5 and for three conventional magneto-optic recording media.

For comparison, a magneto-optic recording media having a $SiO_2$ dielectric layer having a thickness of 1000 Å and a silicon nitride dielectric layer having a thickness of 1000 Å, respectively, in place of dielectric layers 22, 23 and 24 shown in FIG. 5 was prepared. An acceleration test using the above media was performed at constant temperature and humidity of 60° C. and 90% relative humidity (RH). The results of the test are shown in FIG. 6. The ordinate of the graph is the Figure of Merit, that is, the product of the square root of reflectance and Kerr rotation angle in minutes. The Figure of Merit value is substantially directly proportional to the carrier to noise ratio (C/N) of the recording medium. The abscissa of the graph indicates the time elapsed during the acceleration test. A curve 80 shows the results for a magneto-optic recording medium including at least two dielectrics in accordance with the invention, curve 81 shows the results for a recording medium using only a silicon nitride layer as the dielectric material, curve 82 records the results for a medium using only an aluminum nitride layer as the dielectric material and curve 83 shows the results for a recording medium using only a $SiO_2$ layer as the dielectric material.

As can be seen from the results reported in FIG. 6, the properties of a magneto-optic recording medium prepared in accordance with the invention shown by curve 80 do not deteriorate and the medium can be practically used. In contrast, a recording medium using $SiO_2$ as a dielectric material oxidizes quickly so that it is not suitable for practical use, as shown in curve 83. As shown in curves 81 and 82, when a nitride is used as a dielectric material, properties deteriorate considerably. While the media can be used, it is difficult to do so. Nitrides do not adhere easily to plastic substrates and cracks occur. In the weatherability test, cracks in the nitride dielectric materials occurred after 10 hours had elapsed. For this reason, magneto-optic recording media using nitride dielectric materials are not available for practical use because of the occurrence of cracks. This is true even though the Figure of Merit value is not as low as that for the medium using a $SiO_2$ dielectric layer. In magneto-optic recording medium 20, no cracks occurred even after 1000 hours had elapsed.

In the magneto-optic recording media having the properties shown by curves 81 and 82, silicon nitride and aluminum nitride dielectric layers each having a thickness of 1000 Å were used to provide a dielectric thickness equal to the thickness of the dielectric layer of magneto-optic recording medium 20 having the properties shown by curve 80. Additionally, the layer thickness was less than 2000 Å and, therefore, no cracks occurred on the PMMA or PC plastic substrates or on glass substrates having ultraviolet curing resin layers.

Additional magneto-optic recording media having silicon nitride dielectric layers with a thickness of 1500 Å and 2000 Å and media having aluminum nitride dielectric layers of a thickness of 1500 Å and 2000 Å were prepared. These media were subjected to an accelerated aging test at constant temperature and humidity of 60° C. and 90% relative humidity, respectively. Cracks occurred in the same manner as in the media shown in FIG. 6 and, consequently, these recording media are also not suitable for practical use.

Figure 7A:
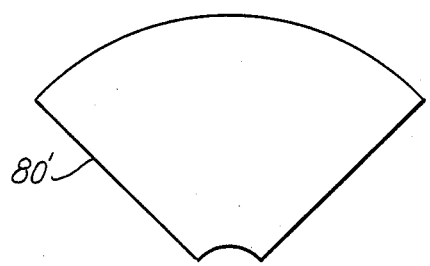
FIGS. 7(a)–(c) are top plan views of several magneto-optic recording media after weatherability testing.
Figure 7B:
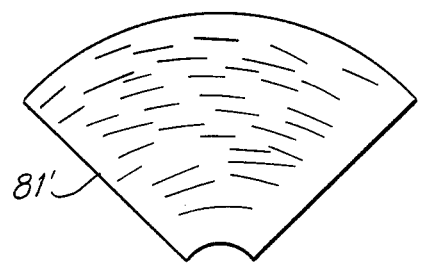
Figure 7C:
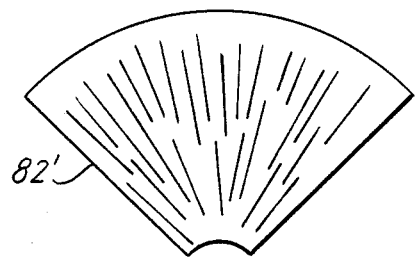

FIGS. 7(a), 7(b) and 7(c) show the appearance of recording media 80', 81" and 82" having the properties shown in curves 80, 81 and 82, respectively, after the accelerated test described in connection with FIG. 6. Recording medium 80' having the properties of curve 80 is a magneto-optic recording medium formed from a laminated film of aluminum nitride and silicon nitride as the dielectric material in accordance with the invention and in which no cracks occur. Recording medium 81' having the properties of curve 81 includes only a silicon nitride film as the dielectric material and cracks occur in the tangential direction as shown in FIG. 7(b). Medium 82" having the properties of curve 82 includes only an aluminum nitride film as a dielectric material and cracks occur in the radial direction as shown in FIG. 7(c). The substrate used for this experiment had a diameter of 12 cm and a ¼ segment of each disk is shown in the figures.

Figure 8:
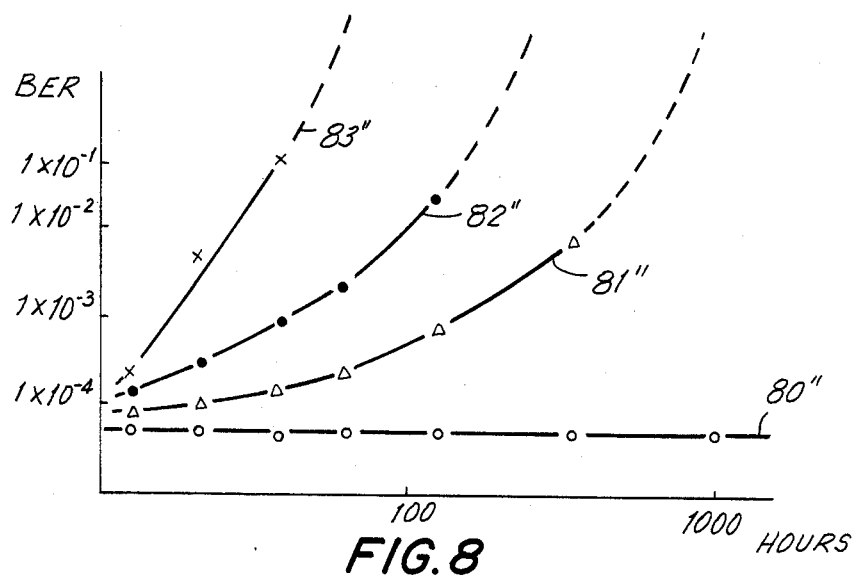
FIG. 8 is a graph showing Bit-Error Rate (BER) as a function of time for the magneto-optic recording media of FIG. 5 and three conventional magneto-optic recording media.

FIG. 8 shows the experimentally determined increase in Bit-Error Rate (BER) as a function of time after the weatherability test. Curves 80", 81" and 82" are the results for media 80', 81' and 82', respectively, of FIGS. 7(a)–(c). These media had properties represented by curves 80, 81 and 82 of FIG. 6, respectively. Curve 83" shows the results for medium 83' having a $SiO_2$ dielectric layer having the results of curve 83 of FIG. 6. Curve 80" reports BER as a function of time for a medium 80' including a dielectric layer of two dielectric materials in accordance with the invention as shown in FIG. 5, curve 81" reports BER as a function of time for a recording medium including silicon nitride as the dielectric material, curve 82" reports BER as a function of time for a medium including aluminum nitride as the dielectric material, and curve 83" reports BER as a function of time for a recording medium including $SiO_2$ as the dielectric material. The ordinate of the graph indicates the BER and the abscissa indicates the time elapsed for the weatherability test. As can be seen from the results reported in FIG. 8, the BER of the recording medium prepared in accordance with the invention as shown by curve 80" does not increase, but the BER of recording media using other dielectric layers increases rapidly. In particular, the deterioration of recording properties of a recording medium using a $SiO_2$ dielectric layer as shown by curve 83" is severe. The dotted lines indicate that BER increases are projected, but cannot be measured. Based on the results of the accelerated aging tests, it is projected that recording media prepared in accordance with the invention can be used for more than 10 years.

EXAMPLE 2

Various types of dielectric films were formed on a PMMA substrate at a thickness of 1000 Å, a weatherability test was conducted and the direction of cracks were observed. Table 1 shows the results:

TABLE 1

| | |
|---|---|
| Aluminum Nitride | radial direction |
| Silicon Nitride | tangential direction |
| Zinc sulfide | tangential direction |
| Titanium Nitride | tangential direction |
| Zirconium Nitride | tangential direction |
| Hafnium Nitride | tangential direction |
| Silicon Carbide | radial direction |
| Titanium Carbide | tangential direction |

TABLE 1-continued

| | |
|---|---|
| Zirconium Carbide | tangential direction |

A dielectric material which exhibited cracks running in the radial direction and a dielectric material which exhibited cracks running in the tangential direction were laminated on a PMMA substrate. The thickness of each layer was 500 Å so that the total thickness of the dielectric material layer was 1000 Å. An accelerated aging test at 60° C. and 90% relative humidity was run for 1000 hours and no cracks were observed. Table 2 shows the results;

TABLE 2

| | cracking |
|---|---|
| Aluminum Nitride/Silicon Nitride | none |
| Aluminum Nitride/Zinc Sulfide | none |
| Aluminum Nitride/Zinc Sulfide | none |
| Aluminum Nitride/Titanium Nitride | none |
| Aluminum Nitride/Zirconium Nitride | none |
| Aluminum Nitride/Hafnium Nitride | none |
| Aluminum Nitride/Titanium Carbide | none |
| Aluminum Nitride/Zirconium Nitride | none |
| Silicon Carbide/Silicon Nitride | none |
| Silicon Carbide/Zinc Sulfide | none |
| Silicon Carbide/Titanium Nitride | none |
| Silicon Carbide/Zirconium Nitride | none |
| Silicon Carbide/Hafnium Nitride | none |
| Silicon Carbide/Titanium Carbide | none |
| Silicon Carbide/Zirconium Carbide | none |

The results shown in Table 2 demonstrate that when a dielectric material layer is prepared by laminating a dielectric material which exhibits cracks running in the radial direction in combination with a dielectric material which exhibits cracks running in the tangential direction, no cracking occurs. Experimental observation has also shown that the Figure of Merit and the BER values do not deteriorate during the accelerated aging tests for magneto-optic recording media having laminated dielectric films as shown in Table 2. Furthermore, reliability for more than ten (10) years can be expecteed. No problems occur when the dielectric material layer is formed as a three or four layer material. In the test results reported herein, dielectric material which cracks in the radial direction was formed first. However, it is also acceptable to form the dielectric material which cracks in the tangential direction first. Additionally, a polycarbonate substrate, an epoxy resin substrate, a glass substrate having an ultraviolet curing resin layer and the like can be used instead of the PMMA substrate.

EXAMPLE 3

Figure 9:
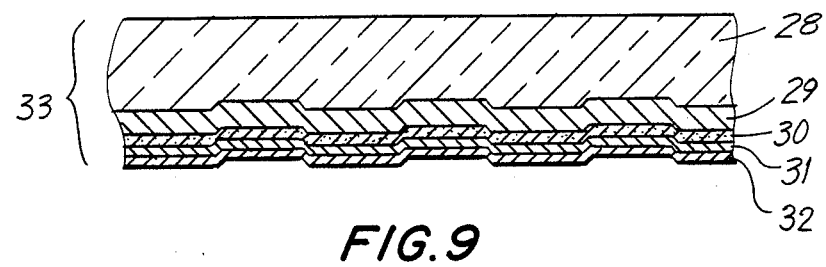
FIG. 9 is a cross-sectional view of an alternate magneto-optic recording medium of the invention.

Referring to FIG. 9, a cross-sectional view of a magneto-optic recording medium 33 including a dielectric film 29 formed of a mixture of two different dielectric materials between the magneto-optic recording layer 30 and the transparent substrate 28 is shown. The recording medium includes a PC substrate 28 having grooves with a pitch of 1.6 μm, a width of 0.8 μm and a depth of 700 Å. A mixed dielectric film 29 was formed to a thickness of 1000 Å on the grooved side of the PC substrate 28. Mixed dielectric film 29 was prepared by mixing aluminum nitride and zinc sulfide. A GdTbFeCo magneto-optic recording layer 30 having a thickness of 300 Å was formed on mixed dielectric film 29. An amorphous silicon film 31 having a thickness of 150 Å was formed on magneto-optic recording layer 30 and an aluminum film 32 for use as a reflective layer having a thickness of 300 Å was formed on amorphous silicon film 31. When magneto-optic recording medium 33 was subjected to the accelerated aging test at 60° C. and 90% relative humidity, no cracking occurred even after 1000 hours. Neither the Figure of Merit nor the BER was lowered and, in this respect, it can be seen that a medium using a mixed dielectric film is similar to a medium using a multi-layer dielectric film. It has been experimentally determined that a medium using a mixed dielectric film can be expected to be reliable for more than 10 years.

Additional magneto-optic recording media including a mixed dielectric film having a thickness of 1000 Å were formed on PC substrates. The media were examined for the occurrence of cracks after accelerated aging tests had been run for 1000 hours. Table 3 shows the results.

TABLE 3

| | cracking |
|---|---|
| Aluminum Nitride + Titanium Nitride | none |
| Aluminum Nitride + Zirconium Nitride | none |
| Aluminum Nitride + Hafnium Nitride | none |
| Aluminum Nitride + Titanium Carbide | none |
| Aluminum Nitride + Zirconium Carbide | none |
| Silicon Carbide + Silicon Nitride | none |
| Silicon Carbide + Zinc Sulfide | none |
| Silicon Carbide + Titanium Nitride | none |
| Silicon Carbide + Zirconium Nitride | none |
| Silicon Carbide + Hafnium Nitride | none |
| Silicon Carbide + Titanium Carbide | none |
| Silicon Carbide + Zirconium Carbide | none |

These experiments demonstrate that a dielectric material in which no cracking occurs can be obtained by compounding a dielectric material which exhibits cracks running in the radial direction and a dielectric material which exhibits cracks running in the tangential direction. Such a mixed dielectric film can be formed by any known method of which, co-sputtering, co-evaporation, sputtering using the compound dielectric material as a target and reactive sputtering are exemplary.

The substrate is not limited to a PC substrate. Other substrates such as PMMA substrates, epoxy resin substrates, and glass substrates having ultraviolet curing resin layers can also be used. In magneto-optic recording media including a mixed dielectric film, the Figure of Merit and the BER are not lowered during the acceleration test and reliability for more than 10 years is expected.

Although GdTbFeCo was used as the magneto-optic recording layer of this example, it is also within the scope of the invention to use magneto-optic recording layers of heavy rare earth transition metal types like TbFe, TbFeCo, GdFe, GdCo, TbCo, TbDyFeCo and the like. Optionally, light rare earth materials like Sm, Nd and the like can be added.

In this example, only magneto-optic recording media are referred to. However, the invention is also applicable to erasable and rewriteable optical recording media in which the variation of the degree of reflection is used as the signal by changing the crystalline structure of the recording layer, for example, from crystalline to non-crystalline, from non-crystalline to crystalline, from hexagonal to cubic, from cubic to hexagonal and the like. In other words, the phase is transformed or for direct read after write DRAW type optical recording media, holes or bubbles are formed in the recording layer.

EXAMPLE 4

Figure 10:
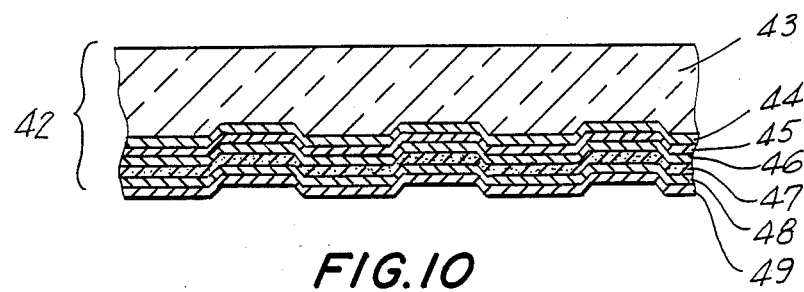
FIG. 10 is a cross-sectional view of another alternate magneto-optic recording medium of the invention.

FIG. 10 is a cross-sectional view of an alternate structure for a magneto-optic recording medium shown generally as 42. A PMMA substrate 43 with a groove pitch of 2.5 μm, a width of 0.7 μm and a depth of 700 Å is used. A series of dielectric layers 44, 45 and 46 were provided on the grooved side of PMMA substrate 43. Dielectric layer 44 is an aluminum nitride film having a thickness of 250 Å, dielectric layer 45 is a silicon nitride film having a thickness of 500 Å, and dielectric layer 46 is an aluminum nitride film having a thickness of 250 Å. A GdTbFeCo magneto-optic recording film layer 47 having a thickness of 300 Å was formed on dielectric layer 46 and an amorphous silicon layer 48 having a thickness of 150 Å was formed on magneto-optic recording film layer 47. Amorphous silicon layer 48 enhances the polarizing face of the laser beam passed through magneto-optic recording film layer 47. Aluminum film 49 having a thickness of 300 Å was formed on amorphous silicon layer 48 for use as a reflective film.

Figure 11:
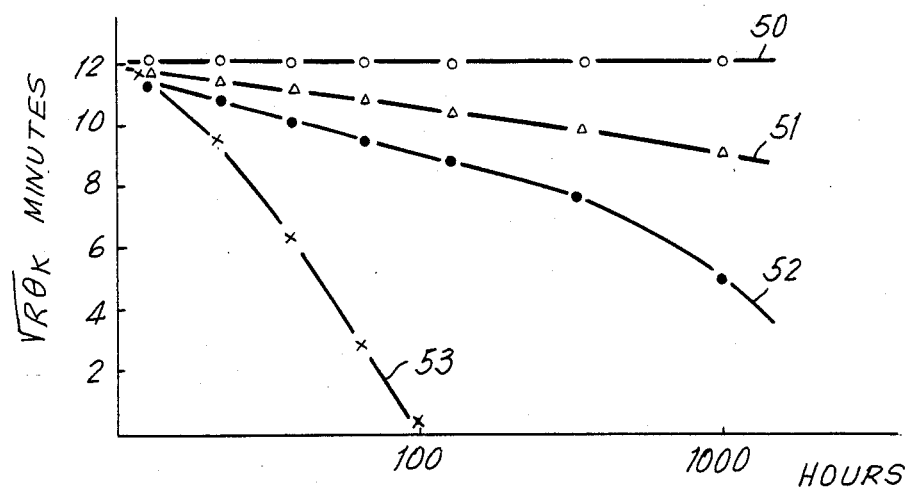
FIG. 11 is a graph showing the Figure of Merit as a function of time for the magneto-optic recording medium of FIG. 10 and for three conventional magneto-optic recording media.

Recording media constructed by conventional methods were also prepared for purposes of comparison. The media constructed by conventional methods replaced dielectric material of layers 44, 45 and 46 shown in FIG. 10 with a single silicon dioxide ($SiO_2$) layer having a thickness of 1000 Å, a single aluminum nitride layer having a thickness of 1000 Å and a single silicon nitride layer having a thickness of 1000 Å, respectively. Accelerated aging tests using each of the above media were performed in a constant temperature-humidity bath at 60° C. and 90% relative humidity. The results of the tests are shown in FIG. 11. The ordinate of the graph is the Figure of Merit, that is, the product of the square root of reflectance and Kerr rotation angle in minutes. This value is substantially proportional to the carrier to noise ratio (C/N) of a medium. The abscissa reports the time elapsed for the accelerated aging test. Curve 50 reports the results of magneto-optic recording medium 42, curve 51 reports the results for a recording medium including only silicon nitride as the dielectric material, curve 52 reports the results for a medium including only aluminum nitride as the dielectric material, and curve 53 shows the results for a medium including only silicon dioxide ($SiO_2$) as the dielectric material. As can be seen from the results graphed in FIG. 11, the properties of the recording medium 42 do not deteriorate, and therefore the medium is suitable for use. The medium using silicon dioxide ($SiO_2$) as the dielectric material was quickly oxidized, indicating that it was not satisfactory. The media represented by curves 51 and 52, which use a single nitride layer for the dielectric materials, had properties that deteriorated considerably, indicating that they were difficult to use. Furthermore, it is difficult to adhere a nitride to a plastic substrate and cracks easily occur. In fact, during the weatherability test, cracks began to occur after ten (10) hours had passed. For this reason, the media represented by curves 51 and 52 are not suitable for practical use even though the Figure of Merit of the media is not reduced as low as the Figure of Merit for the medium using a silicon dioxide ($SiO_2$) dielectric layer. In recording medium 42 represented by curve 50, no cracks occurred even after 1000 hours had passed.

In the media represented by curves 51 and 52, silicon nitride and aluminum nitride dielectric material layers having thicknesses of 1000 Å were used, respectively, in order to make the dielectric layer thickness equal to the dielectric material layer thickness of recording medium 42 represented by curve 50. Additionally, this prevented cracks from occurring on the plastic substrate such as PMMA and PC and on the glass substrate with ultraviolet curing resin layer, which would have occurred if the film thickness were more than 2000 Å.

Figure 1:
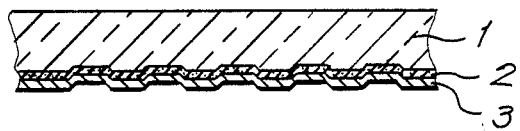
FIG. 1 is a cross-sectional view of a conventional magneto-optic recording medium.
Figure 2:
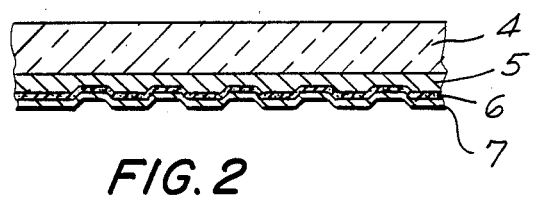
FIG. 2 is a cross-sectional view of another conventional magneto-optic recording media.
Figure 3:
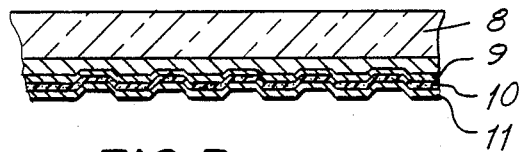
FIG. 3 is a cross-sectional view of yet another conventional magneto-optic recording medium.
Figure 4:
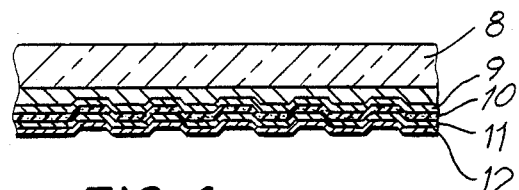
FIG. 4 is a cross-sectional view of a conventional magneto-optic recording medium having a reflective film.

Another accelerated aging test was performed in a constant temperature-humidity bath at 60° C. and 90% relative humidity using the media represented by curves 51 and 52, with the exception that the silicon nitride and aluminum nitride dielectric layers were used at thicknesses of 1500 Å and 2000 Å. As a result, cracks immediately occurred in the same manner as in the medium shown in FIG. 4, showing that these media are not suitable for practical use.

Figure 12A:
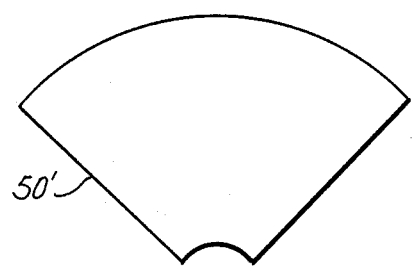
FIGS. 12(a)–(c) are top plan views of several magneto-optic recording media after weatherability testing.
Figure 12B:
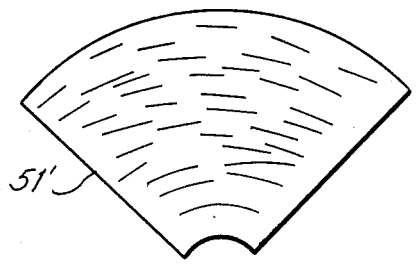
Figure 12C:
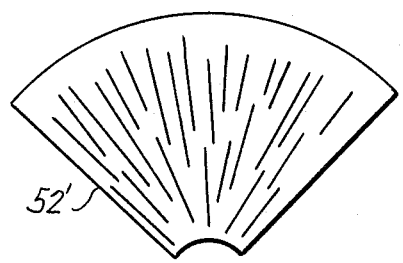

FIGS. 12(a), 12(b) and 12(c) show the appearance of media 50', 51' and 52' after the accelerated aging test reported in FIG. 11. Recording media 50', 51' and 52' correspond to the results of curves 50, 51 and 52, respectively. Medium 51' is a medium using only silicon nitride for the dielectric material and in which cracks occur in the tangential direction. Medium 52' is a medium using only aluminum nitride for the dielectric material and in which cracks occur in the radial direction. The substrate used in this experiment had a diameter of 12 cm and one quarter of the disk is shown in each of FIGS. 12(a), 12(b) and 12(c).

Figure 13:
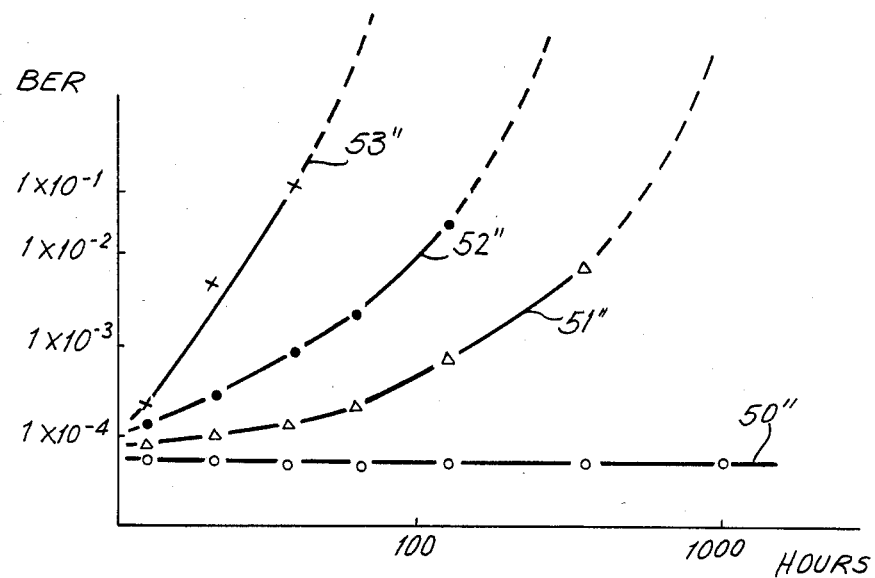
FIG. 13 is a graph showing Bit-Error Rate (BER) as a function of time for the magneto-optic recording medium of FIG. 10 and three conventional magneto-optic recording media.

FIG. 13 shows the experimental results of the increase in Bit-Error Rate (BER) after the weatherability test. Curves 50", 51", 52" and 53" correspond to the media represented by curves 50, 51, 52 and 53 of FIG. 11. Curve 50" are the results for medium 50 in accordance with the invention as shown in FIG. 10. Curve 51" are the results for a medium including silicon nitride as the dielectric material and curve 52" are the results for a medium including aluminum nitride as the dielectric material. The ordinate of the graph indicates the Bit-Error Rate (BER) and the abscissa indicates the time elapsed for the weatherability test. As shown in FIG. 13, the results reported for medium 50 represented by curve 50", the BER does not increase, but in the media having other structures, the BER increases rapidly. In particular, the deterioration of the medium represented by curve 53" is severe. Based on these results of the accelerated aging test, medium 50 should be suitable for more than ten (10) years use. The dotted lines in FIG. 13 indicate that the BER increases which are projected and can not be measured.

EXAMPLE 5

Figure 14:
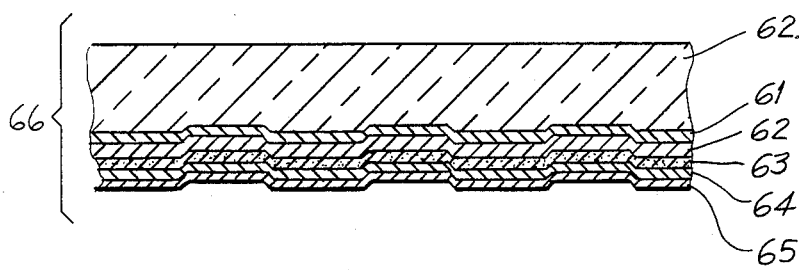
FIG. 14 is a cross-sectional view of another magneto-optic recording medium of the invention.

FIG. 14 is a cross-sectional view showing the structure of a magneto-optic recording medium 66 prepared in accordance with the invention. The structure is the same as that shown in FIG. 10, with the exception of the use of a two layer dielectric film in place of the three layer structure shown in FIG. 10. An aluminum nitride film 61 having a thickness of 250 Å was provided on a guide grooved PMMA substrate 60, and a silicon nitride film 62 having a thickness of 750 Å was provided on film 61. A magneto-optic recording layer 63 of GdTbFe having a thickness of 300 Å was provided on aluminum nitride film 61 and an amorphous silicon film 64 having a thickness of 250 Å was provided on magneto-optic recording layer 63. An aluminum film 65 having a thickness of 300 Å was provided on amorphous silicon film 64 and served as a reflective film. The structure was observed after the weatherability tests which gave the same results as shown by curves 50 and 50'' in FIGS. 11 and 13, respectively.

EXAMPLE 6

Figure 15:
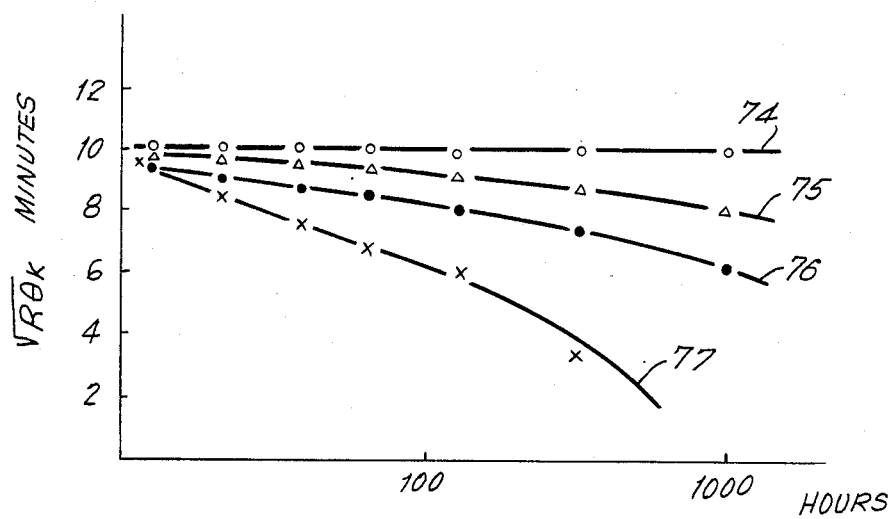
FIG. 15 is a graph showing the Figure of Merit as a function of time for the magneto-optic recording medium of FIG. 14 and three conventional magneto-optic recording media.
Figure 16:
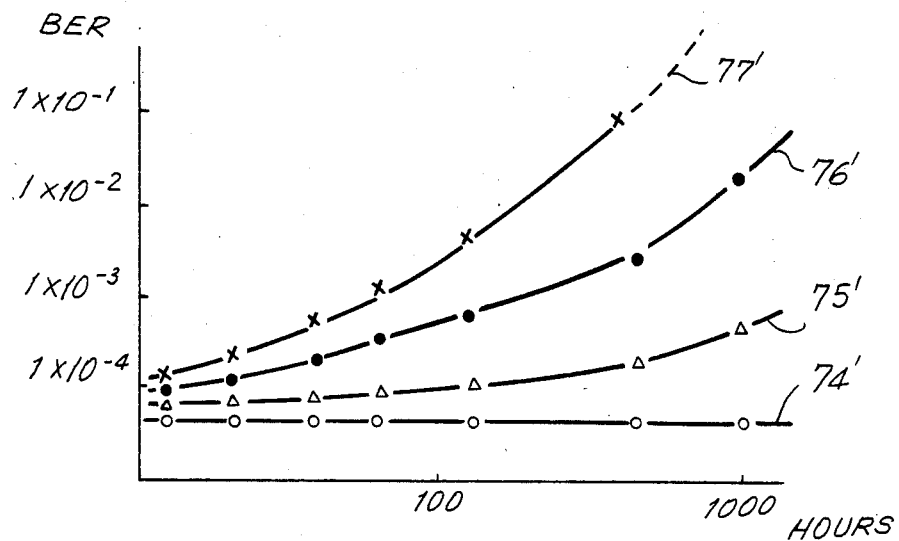
FIG. 16 is a graph showing Bit-Error Rate (BER) as a function of time for the magneto-optic recording medium of FIG. 14 and three conventional magneto-optic recording media.

Experimental results for a recording medium formed with a polycarbonate (PC) layer for the substrate instead of PMMA were measured. The structure of the recording medium was the same as that shown in FIGS. 10 and 14, with the exception that PC was used as the substrate. FIGS. 15 and 16 show the results of the weatherability test. Curve 74 is generated by the medium and the structure is the same as that shown in FIG. 14 except that PC is used for the substrate 60. Curve 75 are results for a medium using PC for the substrate and only a silicon nitride layer for the dielectric material. Curve 76 are results generated for a medium having a PC substrate and only an aluminum nitride layer for the dielectric material. Curve 77 are results for a medium including only silicon dioxide ($SiO_2$) for the dielectric material. The results in FIG. 15 show that a medium prepared in accordance with the invention has superior weatherability properties compared to the other media. FIG. 15 shows that the Figure of Merit at the initial stage is lower and the deterioration of the media is smaller compared to FIG. 11. This is due to the fact that the PC substrate has low birefringence and a lower water absorption than PMMA. The same comparison can be made of FIG. 16 with FIG. 13, wherein curves 74', 75', 76' and 77' correspond to the media used to generate curves 74, 75, 76 and 77.

EXAMPLE 7

Figure 17:
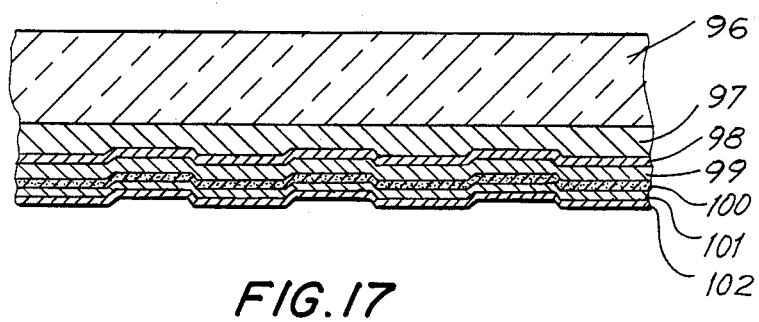
FIG. 17 is another magneto-optic recording medium in accordance with the invention.

A similar experiment was performed for a medium having a guide groove glass substrate 96 having an ultraviolet curing resin layer. The structure is shown in FIG. 17. Glass substrate 96 included an ultraviolet curing resin layer 97. An aluminum nitride layer 98 having a thickness of 250 Å was provided on ultraviolet curing resin layer 97 and a silicon nitride layer 99 having a thickness of 750 Å was provided on aluminum nitride layer 98. A magneto-optic recording layer 100 of GdTbFeCo having a thickness of 300 Å was disposed on silicon nitride layer 99 and an amorphous silicon layer 101 having a thickness of 250 Å was provided on magneto-optic recording layer 100. An aluminum layer 102 having a thickness of 300 Å was formed on amorphous silicon layer 101 as a reflective film. The results obtained were substantially the same as those shown in FIGS. 15 and 16. Thus, it was demonstrated that the invention is also suitable for use with a glass substrate having an ultraviolet curing resin layer.

For purposes of this example, it was necessary to provide the first dielectric layer with a thickness of less than 2000 Å because cracks occur in the dielectric layer when the thickness of the aluminum nitride film in combination with the silicon nitride film or zinc sulfide film first provided on PMMA, PC or the glass substrate having an ultraviolet curing resin layer is greater than 2000 Å. As discussed, two structures of dielectric material layers are provided. One structure has three layers composed of silicon nitride sandwiched between upper and lower aluminum nitride layers and the other is two layers composed of one of aluminum nitride and the other of silicon nitride. The invention can also be used with multi-layers, for example, a three or four layer structure using silicon nitride for the first layer or four layers using aluminum nitride for the first layer.

The magneto-optic recording layer used in this embodiment is a GdTbFeCo film. No problem arise when rare earth transition metal layers such as TbFe, TbFeCo, GdFe, GdCo, TbDyFe, NdDyFe and the like are also used.

Furthermore, no problems result from replacing the amorphous silicon layer with a dielectric material layer such as aluminum nitride, silicon nitride, zinc sulfide and the like. The present invention is also available for E-DRAW (Eraser-Direct Read After Write) type optical recording media wherein the difference in reflectance obtained by phase-transition of the crystalline structure of the recording layer is used as a signal, that is, from crystalline to amorphous and vice-versa or from hexagonal to cubic and vice-versa. The invention is also suitable for DRAW (Direct Read After Write) type optical recording media wherein a hole is opened in the recording layer and a bubble is formed or phase-transition is made.

As discussed, the C/N and BER are not deteriorated over a long period of time and no cracks occur for the magneto-optic recording media in accordance with the invention. Furthermore, reliability of the optical recording media over a long period of time is improved substantially. The cost is sharply reduced because there is no need to form a guide groove directly on a glass substrate and a plastic substrate or a glass substrate having an ultraviolet curing resin layer can be used. The invention is also advantageous in effectively utilizing the enhancement effect of Kerr rotation angle because the dielectric materials are formed without generating cracks, thereby leading to an improvement in C/N.

It will thus be seen that the objects set forth above among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A magneto-optic recording medium comprising:
   a transparent substrate;
   a non-oxide dielectric layer formed on the substrate, the dielectric layer including at least one layer of a first dielectric material selected from the group consisting of aluminum nitride and silicon carbide and at least one layer of a second dielectric material selected from the group consisting of silicon nitride, zinc sulfide, titanium nitride, zirconium nitride, hafnium nitride, titanium carbide and zirconium carbide; and
   a magneto-optic recording layer formed on the dielectric layer.

2. The recording medium of claim 1, further including a reflecting film disposed on the surface of the magneto-optic recording layer.

3. The recording medium of claim 1, wherein the reflecting film is aluminum.

4. The recording medium of claim 1, further including a second dielectric layer for enhancing the effect of a laser beam deposited on the magneto-optic recording layer.

5. The recording medium of claim 2, further including a second dielectric layer for enhancing the effect of a laser beam deposited on the magneto-optic recording layer and a reflecting film formed on the second dielectric layer.

6. The recording medium of claim 1, wherein the dielectric layer includes at least one layer of aluminum nitride and at least one layer of silicon nitride.

7. The recording medium of claim 1, wherein the thickness of the dielectric layer is less than about 2000 Å.

8. The recording medium of claim 1, wherein the dielectric layer includes a first layer of aluminum nitride on the substrate, a layer of silicon nitride thereon and a second layer of aluminum nitride on the silicon nitride layer.

9. The recording medium of claim 1, wherein information is recorded onto, reproduced from and erased from the magneto-optic recording layer by irradiation of the magnetooptic recording layer with condensed laser light.

10. The recording medium of claim 1, wherein the magneto-optic recording layer is a gadolinium-terbium-iron-cobalt layer.

11. The recording medium of claim 1, wherein the transparent substrate is a polymethylmethacrylate substrate.

12. The recording medium of claim 1, wherein the transparent substrate is a polycarbonate substrate.

13. The recording medium of claim 1, wherein the substrate is a glass substrate having an ultraviolet curing resin layer formed thereon.

14. The recording medium of claim 1, wherein the surface of the substrate facing the dielectric layer is formed with guide grooves.

15. The magneto-optic recording medium of claim 1, wherein at least one layer of the first dielectric material is formed on the substrate and at least one layer of the second dielectric material is formed on the at least one layer of the first dielectric material.

16. The magneto-optic recording medium of claim 1, wherein the dielectric layer is formed from a first layer of the first dielectric material disposed on the transparent substrate and a second layer of the second dielectric material disposed on the first layer of the first dielectric material.

17. The magneto-optic recording medium of claim 1, wherein the dielectric layer is formed from a first layer of the second dielectric material disposed on the transparent substrate and a second layer of the first dielectric material disposed on the first layer of the second dielectric material.

18. A magneto-optic recording medium comprising:
a transparent substrate;
a non-oxide dielectric layer formed on the substrate, the dielectric layer formed of a mixture of at least one first dielectric material selected from the group consisting of aluminum nitride and silicon carbide and at least one second dielectric material selected from the group consisting of zinc sulfide, titanium nitride, zirconium nitride, hafnium nitride, titanium carbide and zirconium carbide; and
a magneto-optic recording layer formed on the dielectric layer.

19. The recording medium of claim 18, further including a reflecting film disposed on the surface of the magneto-optic recording layer.

20. The recording medium of claim 19, wherein the reflecting film is aluminum.

21. The recording medium of claim 18, further including a second dielectric layer for enhancing the effect of a laser beam deposited on the magneto-optic recording layer.

22. The recording medium of claim 18, further including a second dielectric layer for enchancing the effect of a laser beam deposited on the magneto-optic recording layer and a reflecting film formed on the second dielectric layer.

23. The recording medium of claim 18, wherein the thickness of the dielectric layer is less than about 2000 Å.

24. The recording medium of claim 18, wherein information is recorded onto, reproduced from and erased from the magneto-optic recording layer by irradiation of the magneto-optic recording layer with condensed laser light.

25. The recording medium of claim 18, wherein the magneto-optic recording layer is a gadolinium-terbium-iron-cobalt layer.

26. The recording medium of claim 18, wherein the transparent substrate is a polymethylmethacrylate substrate.

27. The recording medium of claim 18, wherein the transparent substrate is a polycarbonate substrate.

28. The recording medium of claim 18, wherein the substrate is a glass substrate having an ultraviolet curing resin layer formed thereon.

29. The recording medium of claim 18, wherein the surface of the substrate facing the dielectric layer is formed with guide grooves.

* * * * *